United States Patent
Hwang et al.

(10) Patent No.: US 10,126,597 B2
(45) Date of Patent: Nov. 13, 2018

(54) DISPLAY DEVICE INCLUDING LIGHT-ABSORBING PATTERN AT EDGE THEREOF

(71) Applicant: Samsung Display Co., Ltd., Yongin-Si, Gyeonggi-do (KR)

(72) Inventors: Seongyong Hwang, Asan-si (KR); Sanghoon Lee, Hwaseong-si (KR); Youngji Kim, Jeju-si (KR); Byungseo Yoon, Hwaseong-si (KR); Seongkoo Jeong, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 192 days.

(21) Appl. No.: 15/082,850

(22) Filed: Mar. 28, 2016

(65) Prior Publication Data

US 2016/0342028 A1 Nov. 24, 2016

(30) Foreign Application Priority Data

May 18, 2015 (KR) .................. 10-2015-0068925

(51) Int. Cl.
*G02F 1/1333* (2006.01)
*G02F 1/1335* (2006.01)

(52) U.S. Cl.
CPC .. *G02F 1/133611* (2013.01); *G02F 1/133512* (2013.01); *G02F 1/133605* (2013.01)

(58) Field of Classification Search
CPC ......... G02F 1/133611; G02F 1/133308; G02F 1/133608; G02F 1/133606; G02F 1/133605; G02F 2001/133314; G02F 2001/133317

USPC .................................................. 349/58, 62
See application file for complete search history.

(56) References Cited

U.S. PATENT DOCUMENTS

| 6,074,070 A * | 6/2000 | Sasako | G02B 6/0055 362/301 |
| 6,123,430 A * | 9/2000 | Ono | G02B 6/0055 362/23.15 |
| 8,662,693 B2 * | 3/2014 | Huang | G02F 1/133605 349/58 |
| 2012/0086896 A1 * | 4/2012 | Tanaka | G02F 1/133308 349/112 |
| 2012/0218752 A1 * | 8/2012 | Sumitani | F21V 11/14 362/235 |
| 2013/0050989 A1 * | 2/2013 | Shen | G02F 1/133602 362/97.1 |

FOREIGN PATENT DOCUMENTS

| JP | 2008-145655 A | | 6/2008 |
| KR | 1020110026827 A | | 3/2011 |
| KR | 1020140022154 A | | 2/2014 |
| TW | 530143 | * | 5/2003 |

* cited by examiner

*Primary Examiner* — Hoan C Nguyen
(74) *Attorney, Agent, or Firm* — Cantor Colburn LLP

(57) ABSTRACT

A display device includes: a display panel which displays an image; a light source which generates and provides the light to the display panel; a lower frame on which the light source is disposed; a reflective sheet between the light source and the lower frame; and a light-absorbing pattern on an edge portion of an upper surface of the reflective sheet.

18 Claims, 8 Drawing Sheets

DISPLAY DEVICE INCLUDING LIGHT-ABSORBING PATTERN AT EDGE THEREOF

This application claims priority to Korean Patent Application No. 10-2015-0068925, filed on May 18, 2015, and all the benefits accruing therefrom under 35 U.S.C. § 119, the disclosure of which is incorporated herein in its entirety by reference.

BACKGROUND

1. Field

Exemplary embodiments of the invention relate to a display device, and more particularly, to a display device having enhanced luminance uniformity with respect to a display screen thereof.

2. Description of the Related Art

A liquid crystal display ("LCD") device is a type of display device among flat panel display ("FPD") devices that have gained wide acceptance. An LCD device includes two display substrates having electrodes disposed therein and a liquid crystal layer interposed between the two display substrates. In such an LCD device, orientations of liquid crystal molecules of the liquid crystal layer are rearranged by voltages that are applied to the electrodes, thereby adjusting the amount of light transmitted through the liquid crystal layer such that an image is displayed by the LCD device.

An LCD device, which is a non-emissive type display device, includes a display panel which displays an image and a backlight assembly which generates and provides light to the display panel. Such backlight assemblies are classified into types including direct-type backlight assemblies, edge-type backlight assemblies and corner-type backlight assemblies based on a position of a light source within the backlight assembly.

SUMMARY

One or more exemplary embodiment of the invention is directed to a display device which reduces or effectively prevents a bright spot or a dark spot at an edge portion of the display device.

According to an exemplary embodiment of the invention, a display device includes: a display panel which display an image; a light source which generates and provides the light to the display panel; a lower frame on which the light source is disposed; a reflective sheet between the light source and the lower frame; and a light-absorbing pattern on an edge portion of an upper surface of the reflective sheet.

The light-absorbing pattern may include a light-absorbing material.

The display device may further include an intermediate frame which is disposed on the reflective sheet, coupled to the lower frame and supports the display panel thereon.

The light-absorbing pattern on the edge portion of the upper surface of the reflective sheet may be disposed between the intermediate frame and the light source in a top plan view.

The intermediate frame may include a first inclined portion extended from the reflective sheet and a second inclined portion which extends from the first inclined portion.

An angle between the first inclined portion and the reflective sheet may be in a range of about 80 degrees to about 110 degrees, and an angle between the second inclined portion and the reflective sheet may be in a range of about 30 degrees to about 60 degrees.

The display device may further include a diffusion plate between the reflective sheet and the display panel.

The display device may further include an optical sheet between the diffusion plate and the display panel.

The light-absorbing pattern may be spaced apart from the light source in a top plan view.

The lower frame may include a bottom portion and a side wall portion which extends from the bottom portion, the reflective sheet disposed between the light source and the bottom portion of the lower frame.

The light-absorbing pattern may be provided in plural and arranged spaced apart from one another along the side wall of the lower frame, and lengths of the plural light-absorbing patterns may each be disposed parallel to the side wall portion of the lower frame.

According to another exemplary embodiment of the invention, a display device includes: a display panel which displays an image; a light source which generates and provides the light to the display panel; a lower frame on which the light source is disposed; a reflective sheet between the light source and the lower frame, the reflective sheet covering a portion of an upper surface of the lower frame, the upper surface of the lower frame facing the display panel; and an intermediate frame which is coupled to the lower frame and surrounds the reflective sheet. The reflective sheet is spaced apart from the intermediate frame in a top plan view, and a light-absorbing member is disposed between the reflective sheet and the intermediate frame spaced apart from each other in the top plan view.

The reflective sheet may expose an edge portion of the upper surface of the lower frame, and the exposed edge portion of the upper surface of the lower frame may define the light-absorbing member disposed between the reflective sheet and the intermediate frame spaced apart from each other in the top plan view.

The reflective sheet may have a quadrangular shape.

In the top plan view, edges of the reflective sheet may define peaks arranged along a side thereof.

The intermediate frame may include a first inclined portion extended from the reflective sheet and a second inclined portion which extends from the first inclined portion.

An angle between the first inclined portion and the reflective sheet may be in a range of about 80 degrees to about 110 degrees, and an angle between the second inclined portion and the reflective sheet may be in a range of about 30 degrees to about 60 degrees.

The display device may further include a diffusion plate between the reflective sheet and the display panel.

The display device may further include an optical sheet between the diffusion plate and the display panel.

The foregoing is illustrative only and is not intended to be in any way limiting. In addition to the illustrative embodiments, and features described above, further embodiments, and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Figure 1:
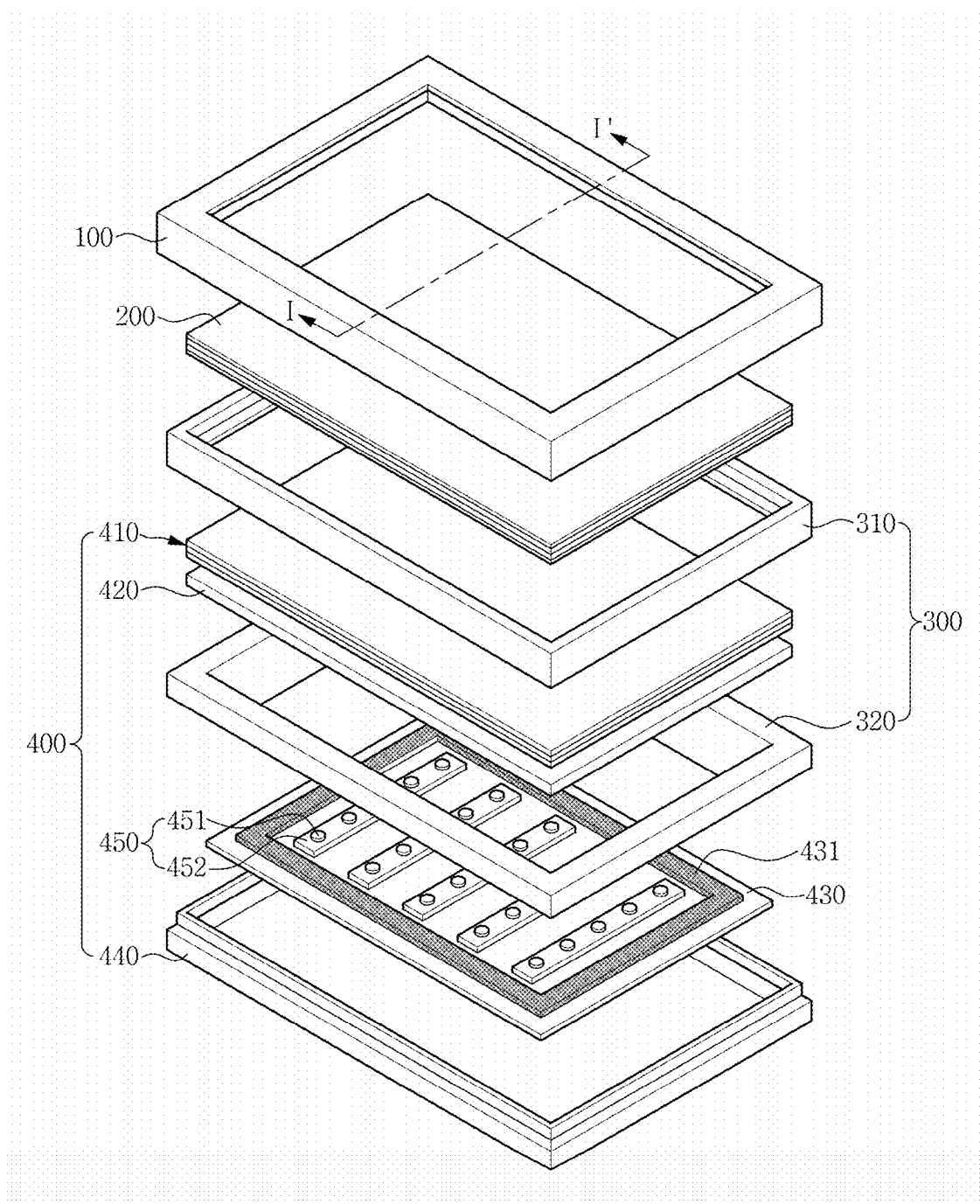
FIG. 1 is a schematic exploded perspective view illustrating an exemplary embodiment of a display device according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The spatially relative terms "below," "beneath," "lower," "above," "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments and may be modified according to the relevant art and the intention of an applicant. Therefore, the terms used herein should be interpreted as having a meaning that is consistent with their meanings in the context of the present disclosure, and is not intended to limit. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Light sources using side-emitting lenses are being employed in direct-type backlight assemblies. Such a light source using a side-emitting lens emits a relatively large amount of light to a side surface of a display device as compared to a conventional display device. As the amount of light emitted to a side surface of a display device increases, the luminance uniformity of the display device may decrease, and a bright spot or a dark spot may occur at an edge portion of the display device.

Hereinafter, an exemplary embodiment of a display device will be described with reference to FIGS. 1, 2, 3, 4A and 4B.

Figure 2:
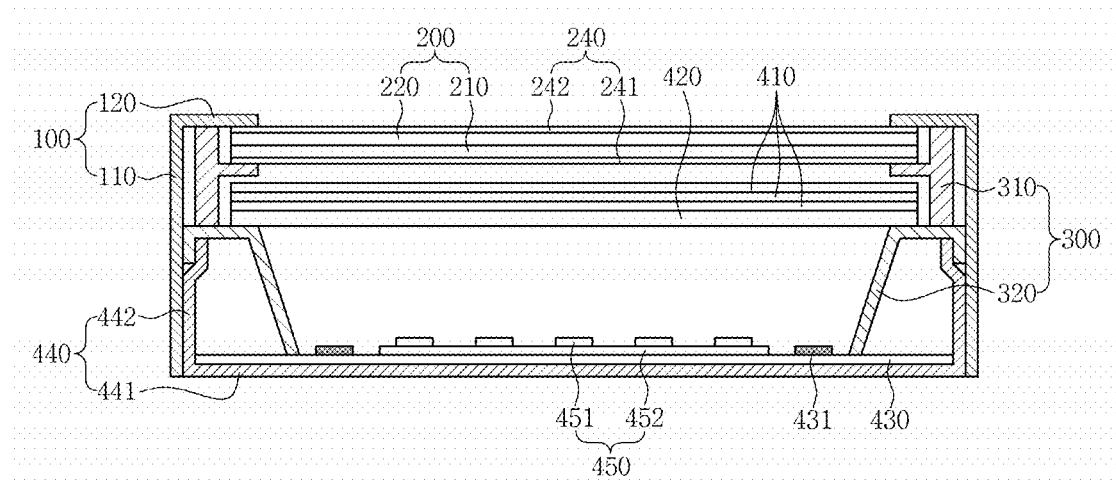
FIG. 2 is a schematic cross-sectional view of the display device taken along line I-I' of FIG. 1.

FIG. 1 is a schematic exploded perspective view illustrating an exemplary embodiment of the display device according to the invention. FIG. 2 is a schematic cross-sectional view of the display device taken along line I-I' of FIG. 1.

Referring to FIGS. 1 and 2, the display device includes a display panel 200, a backlight assembly 400 which generates light and provides the light to the display panel 200, an upper frame 100 configured to surround the display panel 200, and an intermediate frame 300 on which the display panel 200 is mounted.

The upper frame 100 is coupled to a lower frame 440 so as to cover the display panel 200 which is mounted on the intermediate frame 300. The upper frame 100 has an opening defined at a center portion thereof and through which the display panel 200 is exposed. The upper frame 100 is disposed to cover an upper edge and a side surface of the display panel 200 while exposing a front side of the display panel 200.

The upper frame 100 includes a side surface portion 110 covering a side surface of the display panel 200, and a protruding portion 120 bent from the side surface portion 110 to cover the upper edge of the display panel 200. The upper frame 100 may define both the side surface portion 110 and the protruding portion 120. One of the side surface portion 110 and the protruding portion 120 may extend to define the other one of the side surface portion 110 and the protruding portion 120.

The upper frame 100 may be coupled to the lower frame 440 through a coupling member such as including hook coupling and/or screw coupling. In addition, the coupling of the upper frame 100 and the lower frame 440 to each other may be modified in various manners.

The display panel 200 is configured to display images. The display panel 200 as a light-receiving type (or non-emissive-type) display panel may include a liquid crystal display ("LCD") panel, an electrowetting display panel, an electrophoretic display ("EPD") panel, a microelectromechanical system ("MEMS") display panel, and the like. In the exemplary embodiment, an LCD panel is described as the display panel 200 by way of example.

The display panel 200 may be provided in a quadrangular planar shape having two pairs of parallel sides. According to the exemplary embodiment, the display panel 200 may have a rectangular shape having a pair of relatively long sides and a pair of relatively short sides. The display panel 200 includes a first display substrate 210, a second display substrate 220 opposing the first display substrate 210, and a liquid crystal layer (not illustrated) between the first and second display substrates 210 and 220. The display panel 200, when viewed in a plane (e.g., such as in a front/top plan view), has a display area in which an image is displayed, and a non-display area which surrounds the display area and in which an image is not displayed. The non-display area is covered by the upper frame 100.

The first display substrate 210 may include a plurality of pixel electrodes (not illustrated) and a plurality of thin film transistors (not illustrated) which is electrically connected to the pixel electrodes in one-to-one correspondence, on a first base substrate. Each thin film transistor functions as a switch for a driving signal supplied to a corresponding pixel electrode. Further, the second display substrate 220 may include a common electrode (not illustrated) forming an electric field which controls an arrangement of liquid crystals, along with the pixel electrodes, on a second base substrate. The display panel 200 is configured to drive the liquid crystal layer to display an image frontwards.

The display device may include a driving chip (not illustrated) configured to supply a driving signal to the display panel 200, a tape carrier package ("TCP", not illustrated) on which the driving chip is mounted, and a printed circuit board ("PCB", not illustrated) electrically connected to the display panel 200 through the TCP. The driving chip generates a driving signal for driving the display panel 200 in response to an external signal. The external signal is supplied from the PCB and may include an image signal, various control signals, a driving voltage and the like.

A polarizer (or polarizing member) 240 is disposed on the display panel 200, and collectively includes a first polarizer 241 and a second polarizer 242. The first and second polarizers 241 and 242 are disposed on respective opposing surfaces of the first and second display substrates 210 and 220. In other words, the first polarizer 241 may be attached onto an outer side of the first display substrate 210 and the second polarizer 242 may be attached onto an outer side of the second display substrate 220. A transmissive axis of the first polarizer 241 is substantially at a right angle with respect to a transmissive axis of the second polarizer 242.

The intermediate frame 300 is coupled to the lower frame 440 and accommodates the display panel 200, an optical sheet 410 and a diffusion plate 420 therein. The intermediate frame 300 may include a flexible material, such as plastic, in order to reduce or effectively prevent damage to the display panel 200, the optical sheet 410 and the diffusion plate 420 accommodated therein.

The intermediate frame 300 may collectively include an upper mold 310 on which the display panel 200 is mounted and a lower mold 320 on which the optical sheet 410 and the diffusion plate 420 are mounted.

The upper mold 310 is coupled to an upper surface of the lower mold 320 and supports the display panel 200 thereon. In addition, the upper mold 310 may support the upper frame 100.

The lower mold 320 is coupled to the lower frame 440 and supports the optical sheet 410 and the diffusion plate 420 thereon.

The intermediate frame 300 is provided along an edge of the display panel 200 and supports the display panel 200 thereon from therebelow. The intermediate frame 300 fixes or supports components of the display device other than the display panel 200, for example, the optical sheet 410 and the diffusion plate 420. Among the sides of the display panel 200, the intermediate frame 300 may be provided to correspond to each of four sides or at least one of the four sides of the display panel 200. In the top plan view, for example, the intermediate frame 300 may have a quadrilateral-loop shape corresponding to each of the four sides of the display panel 200, or may have a "[" shape, that is, a quadrilateral open-loop shape corresponding to three of the four sides of the display panel 200.

The intermediate frame 300 may be coupled to the upper frame 100. In an exemplary embodiment, for example, screw holes may be defined in the upper frame 100, the lower frame 440 and the intermediate frame 300, and subsequently, the upper frame 100, the lower frame 440 and the intermediate frame 300 may be simultaneously fastened together through screw-coupling using the screw holes. In other words, the upper frame 100, the lower frame 440 and the intermediate frame 300 may be coupled in various manners so as to be fixed to one another.

The backlight assembly 400 includes the optical sheet 410, the diffusion plate 420, a reflective sheet 430, the lower frame 440 and a light source unit 450.

The light source unit 450 includes a light source 451 which generates light and a circuit board 452 on which the light source 451 is disposed. The light source unit 450 may be disposed below the display panel 200. In an exemplary embodiment, for example, the light source unit 450 may be disposed on a bottom surface of the reflective sheet 430 or a bottom surface of the lower frame 440.

The circuit board 452 has a rectangular shape, and has a reflective surface. In an exemplary embodiment, for example, a surface of the circuit board 452 may be treated with a reflective material. In addition, the circuit board 452 may be manufactured using a metal material so as to be reflective and to perform a heat dissipation function and/or a supporting function. The type of the metal material for the circuit board 452 is not particularly limited, and may include various metals having relatively high thermal conductivity. Further, the circuit board 452 may include a coupling hole (not illustrated) defined therein and through which a coupling member (not illustrated) is inserted to be fixed thereto.

The light source 451 may include a light emitting diode ("LED") or the like. The light source 451 may be provided in plural within the display device to generate and provide a light to the display panel 200 which allows the display device to display an image or image information. The light source 451 may be provided in plural with respect to a single circuit board 452 where more than one circuit board 452 is provided in the display device. The light emitted from the light source 451 is transmitted through the diffusion plate 420 and through the optical sheet 410 to thereby be guided toward the display panel 200.

The plural light sources 451 may be arranged to be spaced apart from one another at predetermined intervals so as to achieve the luminance uniformity of the light source unit 450. In an exemplary embodiment, for example, the plurality of light sources 451 may be spaced apart from one another at predetermined intervals in a transverse (e.g., short) direction and a longitudinal (e.g., long) direction of the display device so as to be arranged in a matrix form. In addition, the plural light sources 451 may be arranged parallel to one another in the longitudinal direction, and may be arranged in a zigzag manner in the transverse direction. Also, the light sources 451 may be arranged in parallel to one another in the transverse direction, and may be arranged in a zigzag manner in the longitudinal direction. However, the arrangement of the light sources 451 is not limited thereto, and the light sources 451 may be arranged on the circuit board 452 in various manners to achieve luminance uniformity. Further, the light source 451 may include a side-emitting lens to enhance light extraction efficiency.

The diffusion plate 420 is disposed above the light source unit 450. The diffusion plate 420 receives a light generated and emitted from the light source unit 450 and diffuses the light. In other words, the diffusion plate 420 serves to enhance the luminance uniformity of the light generated from the light source unit 450. In detail, the diffusion plate 420 allows a bright spot to be less visible or invisible from the front of the display device, the bright spot being an area which appears relatively brighter than other areas, based on the disposition of the light source 451. In addition, the diffusion plate 420 may be spaced apart from the light source unit 450 in a cross-sectional thickness direction of the display device, while having an air layer therebetween.

The diffusion plate 420 is fixed to the intermediate frame 300. The diffusion plate 420 may be provided in a quadrangular planar shape, similarly to the display panel 200. However, the shape of the diffusion plate 420 is not limited thereto. According to exemplary embodiments, where an LED is used as the light source 451, the diffusion plate 420 may have various shapes such as including defined therein a predetermined groove and/or a protrusion based on the position of the light source 451.

The diffusion plate 420 is described herein as having a planar shape, that is, a plate, for ease of description. While the diffusion plate 420 is described as a plate, such as having a relatively large cross-sectional thickness for ease of description, the invention is not limited thereto. According to exemplary embodiments, the diffusion plate 420 may be provided in a sheet or film shape for which the cross-sectional thickness is smaller than that of the plate and is relatively small as compared to the planar size thereof, to achieve slimness of the display device. The diffusion plate 420 is to be understood as having a concept that includes not only a plate but also a film which guides light provided from the light source unit 450.

The diffusion plate 420 may include a light-transmissive material. The light-transmissive material may include polycarbonate ("PC"), or an acrylic resin such as polymethyl methacrylate ("PMMA") to help guide light efficiently.

The optical sheet 410 is disposed on the diffusion plate 420 and serves to diffuse and/or collimate light transmitted from the diffusion plate 420. The optical sheet 410 may collectively include a diffusion sheet, a prism sheet, a protective sheet and the like.

The diffusion sheet may serve to disperse a light incident thereon from the diffusion plate 420 to thereby reduce or effectively prevent a partial concentration of the light.

The prism sheet may include, at a surface thereof, prisms having a triangular cross-section and provided in a predetermined array. The prism sheet may be disposed on the diffusion sheet to collimate light diffused from the diffusion sheet in a direction perpendicular with respect to the display panel 200.

The protective sheet may be disposed on the prism sheet, may protect a surface of the prism sheet, and may diffuse light in order to achieve uniform light distribution.

The reflective sheet 430 is disposed between the light source unit 450 and the lower frame 440, and reflects a light emitted downwardly of the diffusion plate 420 to allow the light to be re-directed toward the display panel 200, thereby improving light efficiency.

The reflective sheet 430 includes a bottom portion and a wing (not illustrated) which extends from the bottom portion to form an obtuse angle with respect to the bottom portion. The bottom portion of the reflective sheet 430 may be mounted on the lower frame 440, and the wing of the reflective sheet 430 may be disposed on the intermediate frame 300 such as a side wall or inclined portion of the intermediate frame 300. The reflective sheet 430 may define the bottom portion thereof and the wing thereof. One of the bottom portion and the wing may extend to define the other of the bottom portion and the wing.

The reflective sheet 430 may include, for example, polyethylene terephthalate ("PET"), thus having reflectivity. A surface of the reflective sheet 430 may be coated with a diffusion layer containing, for example, titanium dioxide ($TiO_2$).

According to exemplary embodiments, the reflective sheet 430 may include or be formed of a material containing a metal, such as silver (Ag).

The lower frame 440 accommodates the reflective sheet 430 and the diffusion plate 420 therein. The lower frame 440 includes a bottom portion 441, and a side wall portion 442 which extends from the bottom portion 441. The lower frame 440 may define the bottom portion 441 thereof and the side wall portion 442 thereof. One of the bottom portion 441 and the side wall portion 442 may extend to define the other of the bottom portion 441 and the side wall portion 442. The bottom portion 441 of the lower frame 440 is parallel to the diffusion plate 420. The side wall portion 442 of the lower frame 440 is configured to define an interior of the lower frame 440 with the bottom portion 441. The lower frame 440 may include, for example, a metal material having rigidity, such as stainless steel, or a material having excellent heat dissipation properties, such as aluminum (Al) or an Al alloy. The lower frame 440 maintains an overall framework of the display device and protects various components of the display device accommodated therein.

In such a display device as described above, a portion of a light emitted from the light source 451 is directed laterally toward a side surface of the display device. At an edge portion of the display device, the light directed to the side surface of the display device may cause a bright spot which appears to be brighter than a center portion of the display panel 200 or may cause a dark spot which appears to be darker than the center portion of the display panel 200. In particular, where a side-emitting lens is applied to the light source 451, an amount of the light directed to the side surface of the display device increases and the number of such dark spots and/or bright spots in an edge portion of the display device increases.

Accordingly, the exemplary embodiment of the display device according to the invention a light-absorbing pattern 431 on the reflective sheet 430 in order to reduce or effectively remove the dark spots and/or bright spots occurring at the edge portion of the display device.

Figure 3:
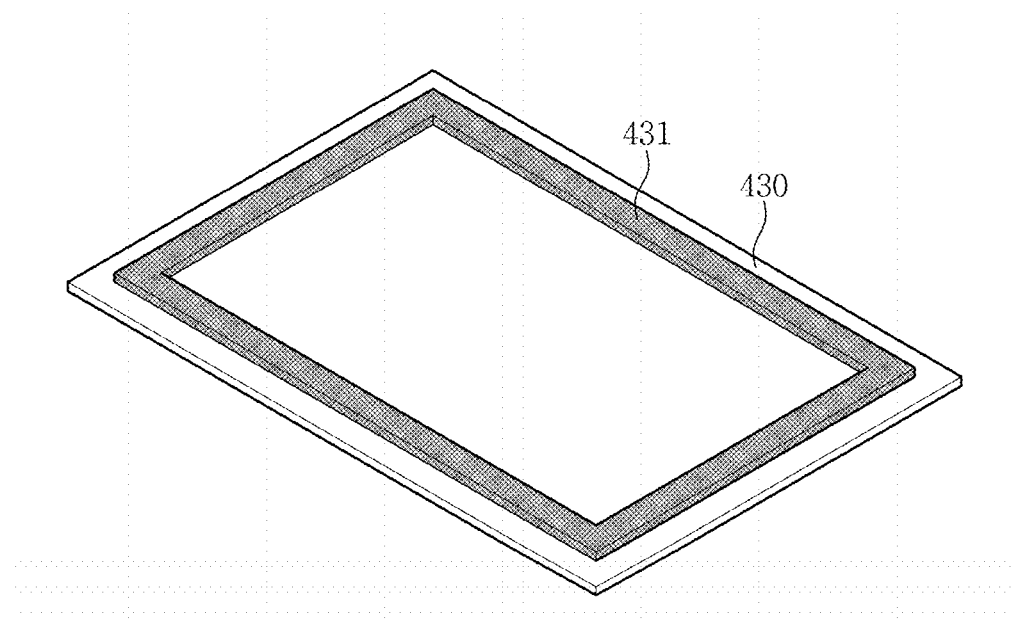
FIG. 3 is a schematic perspective view illustrating an exemplary embodiment of a reflective sheet in the display device of FIG. 1.

FIG. 3 is a schematic perspective view illustrating an exemplary embodiment of the reflective sheet 430 in the display device of FIG. 1.

Referring to FIGS. 2 and 3, the light-absorbing pattern 431 is disposed on an edge of an upper surface of the reflective sheet 430. The light-absorbing pattern 431 is disposed between the intermediate frame 300 and the light source 451. The light-absorbing pattern 431 is spaced apart from the light source 451. In addition, the light-absorbing pattern 431 is disposed on the reflective sheet 430 to be parallel to the bottom portion 441 of the lower frame 440. A cross-sectional thickness of the light-absorbing pattern 431 may be in a range of about 1 millimeter (mm) to about 10 mm. However, the cross-sectional thickness of the light-absorbing pattern 431 is not limited thereto, and may be determined based on the luminance variation within the display device.

The light-absorbing pattern 431 serves as a black matrix. The light-absorbing pattern 431 may include or be formed of a black material. In an exemplary embodiment of a method of manufacturing the display device, the black material may be formed on the reflective sheet 430 such as by printing, but is not limited thereto. The light-absorbing pattern 431 may further include a light-absorbing material such as chromium (Cr). In addition to Cr, the light-absorbing material may include one or more of the following: molybdenum (Mo), silver (Ag), aluminum (Al), gold (Au), and copper (Cu).

The light-absorbing pattern 431 is disposed at the edge of the reflective sheet 430 so as to compensate for luminance differences between the edge portion and the center portion of the display device. In other words, in order to remove the dark spots or bright spots occurring at the edge portion of the display device, the light-absorbing pattern 431 is disposed at the edge of the reflective sheet 430 so as to be adjacent to the edge portion of the display device.

The light-absorbing pattern 431 disposed on the upper surface of the reflective sheet 430 when the reflective sheet 430 faces the bottom surface of the lower frame 440, will be described with reference to FIGS. 4A and 4B.

Figure 4A:
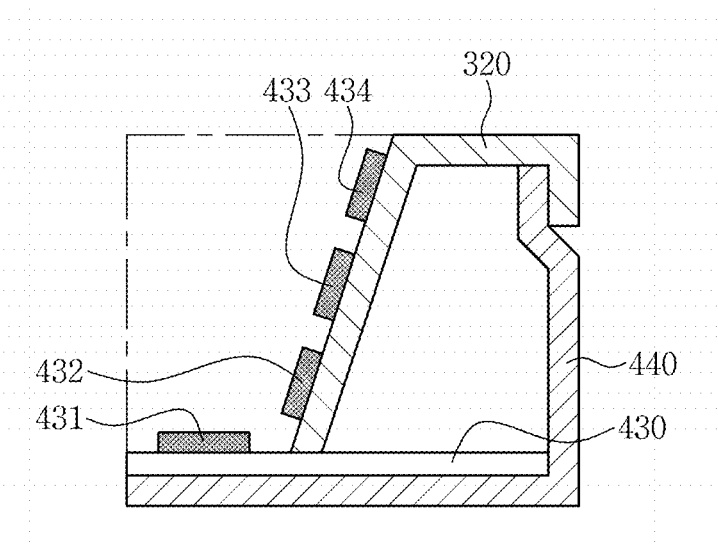
FIG. 4A is a cross-sectional view illustrating an exemplary embodiment of a light-absorbing pattern with respect to a reflective sheet and an intermediate frame of the display device of FIG. 1.
Figure 4B:
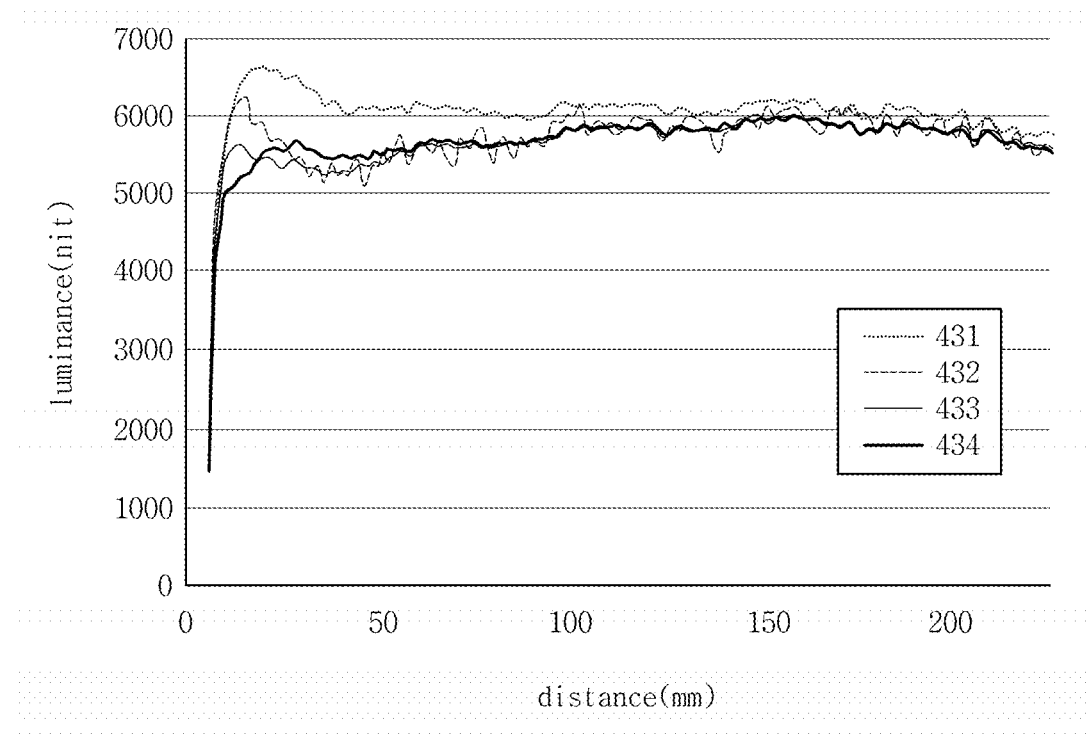
FIG. 4B illustrates luminance variation based on positions of the light-absorbing pattern of FIG. 4A.

FIG. 4A is a cross-sectional view illustrating an exemplary embodiment of a light-absorbing pattern with respect to the reflective sheet 430 and the intermediate frame 300 in the display device of FIG. 1. FIG. 4B illustrates luminance variation based on a positions of the light-absorbing pattern of FIG. 4A.

FIG. 4A illustrates light-absorbing patterns 431, 432, 433 and 434 disposed different positions adjacent to the edge portion of the display device. FIG. 4B illustrates luminance variation based on the positions at which the light-absorbing patterns 431, 432, 433 and 434 are disposed. An X axis represents a distance in mm from the edge portion of the display device, and a Y axis represents a luminance in (candela/$meter^2$[$cd/m^2$]). Among the graph lines for light-absorbing patterns 431, 432, 433 and 434, the display device including the light-absorbing pattern 431 disposed on the upper surface of the reflective sheet 430 has a relatively small luminance variation as compared to the luminance variation illustrated for the light-absorbing patterns 432, 433 and 434 disposed on the inclined surface of the lower mold 320.

The display device having the relatively small luminance variation adjacent to the edge portion thereof may reduce or effectively prevent a bright spot and/or a dark spot from occurring in the edge portion thereof because such a bright spot or a dark spot occurs when a luminance of the edge portion of the display device is relatively greater or less than that of another portion of the display device. Where the light-absorbing pattern 431 is disposed on the upper surface of the reflective sheet 430, a luminance difference between a center portion of the display device and the edge portion thereof may be insignificant, such that the occurrence of a dark spot or a bright spot may be reduced or effectively prevented.

Accordingly, in one or more exemplary embodiment of the display device of FIGS. 1, 2, 3, 4A and 4B, the light-absorbing pattern 431 is disposed on the edge of the upper surface of the reflective sheet 430, thereby enhancing the luminance uniformity of the display device.

Hereinafter, another exemplary embodiment of a display device will be described with reference to FIGS. 5, 6, 7A, 7B and 8. Description of elements in the display device of FIGS. 5, 6, 7A, 7B and 8 which are the same as those of the display device of FIGS. 1, 2, 3, 4A and 4B will be omitted herein for conciseness.

Figure 5:
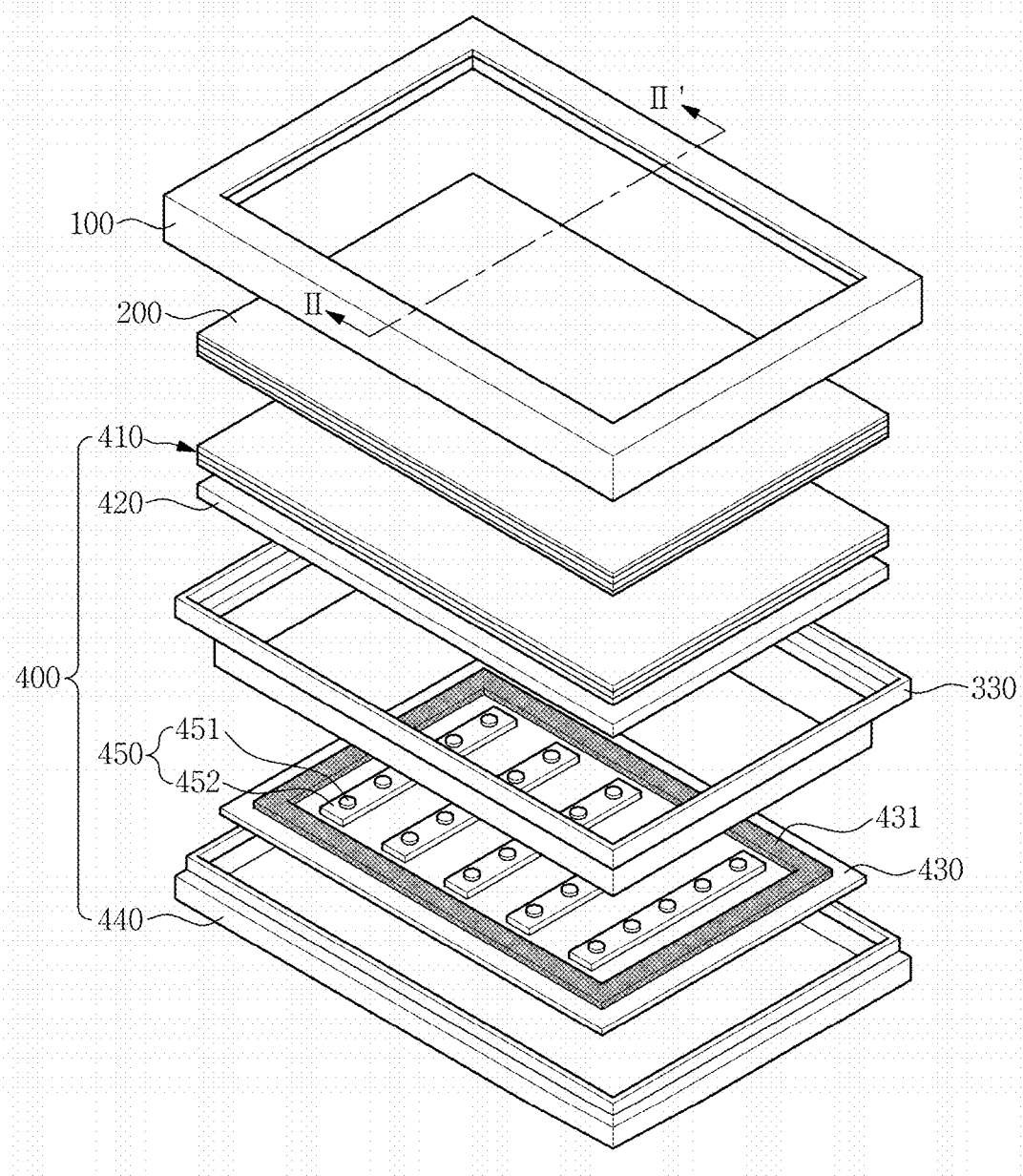
FIG. 5 is a schematic exploded perspective view illustrating another exemplary embodiment of a display device according to the invention.
Figure 6:
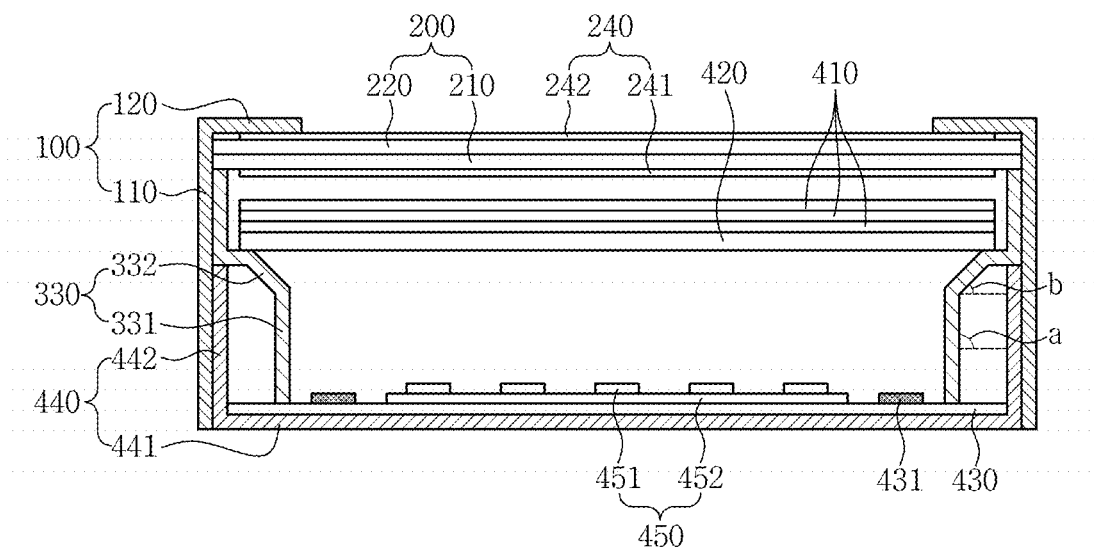
FIG. 6 is a schematic cross-sectional view of the display device taken along line II-II' of FIG. 5.
Figure 7A:
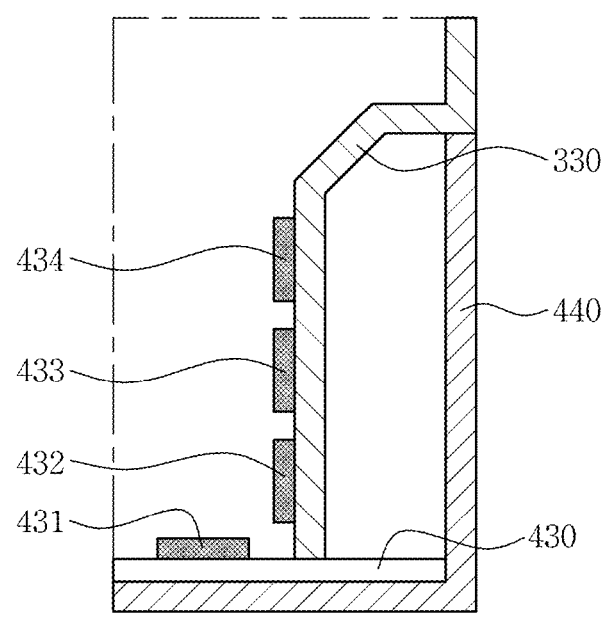
FIG. 7A is a cross-sectional view illustrating an exemplary embodiment of a light-absorbing pattern with respect to a reflective sheet and an intermediate frame of the display device of FIG. 5.
Figure 7B:
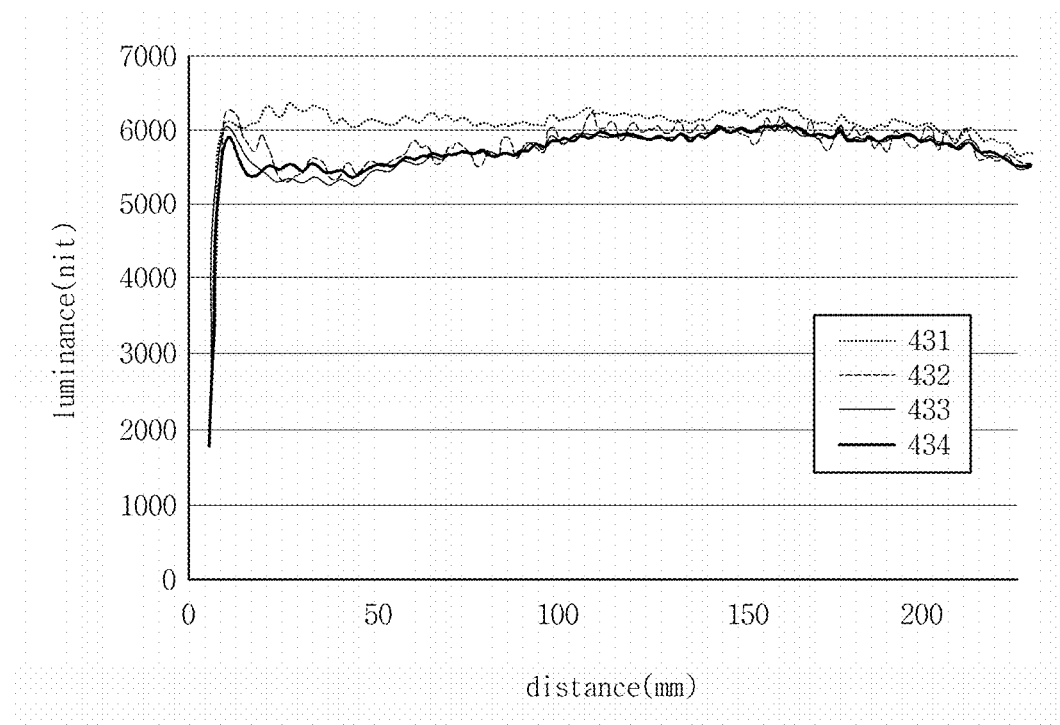
FIG. 7B illustrates luminance variation based on positions of the light-absorbing pattern of FIG. 7A.

FIG. 5 is a schematic exploded perspective view illustrating another exemplary embodiment of a display device according to the invention. FIG. 6 is a schematic cross-sectional view of the display device taken along line II-II' of FIG. 5. FIG. 7A is a cross-sectional view illustrating an exemplary embodiment of a light-absorbing pattern with respect to a reflective sheet 430 and an intermediate frame 330 of the display device of FIG. 5. FIG. 7B illustrates luminance variation based positions of the light-absorbing pattern of FIG. 7A.

Figure 8:
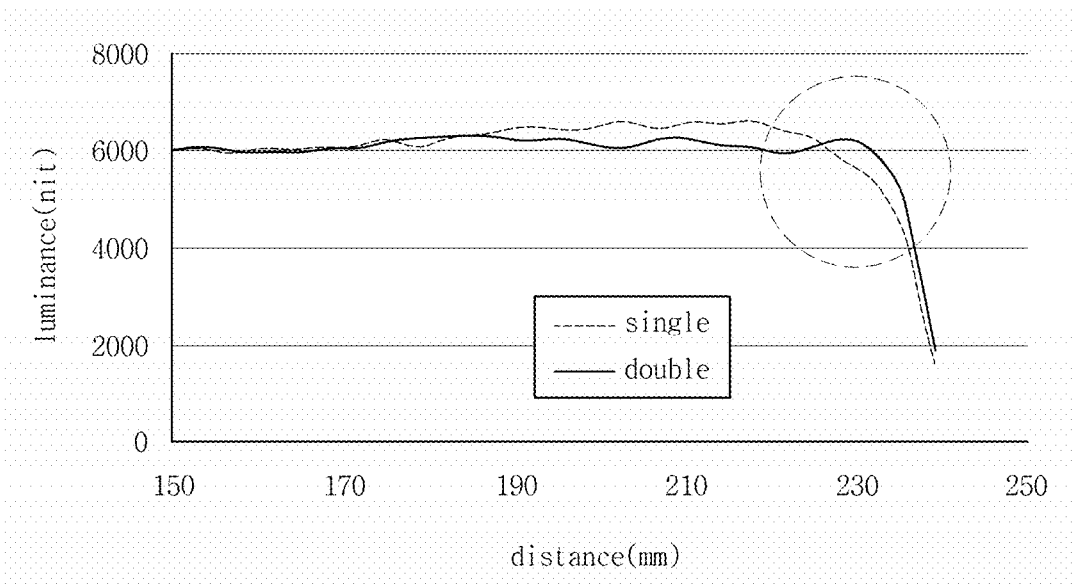
FIG. 8 illustrates a comparison between luminance variation of a display device including an intermediate frame having a double angle defined therein and luminance variation of a display device including an intermediate frame having a single angle defined therein.

FIG. 8 illustrates a comparison between luminance variation of a display device including an intermediate frame having a double angle defined therein and luminance variation of a display device including an intermediate frame having a single angle defined therein.

Referring to FIGS. 5 and 6, the display device includes an intermediate frame 330 having a double angle defined therein. The intermediate frame 330 includes a first inclined portion 331 and a second inclined portion 332 which extends from the first inclined portion 331. An entirety of the intermediate frame 330 may be defined by the first inclined portion 331 and the second inclined portion 332. One of the first inclined portion 331 and the second inclined portion 332 may be extended to define the other of the first inclined portion 331 and the second inclined portion 332. An angle "a" formed between the first inclined portion 331 and the reflective sheet 430 may be in a range of about 80 degrees to about 110 degrees, and an angle "b" formed between the second inclined portion 332 and the reflective sheet 430 may be in a range of about 30 degrees to about 60 degrees. Where the angle "a" formed between the first inclined portion 331 and the reflective sheet 430 and the angle "b" formed between the second inclined portion 332 and the reflective sheet 430 are verified to be within the aforementioned respective ranges based on simulation results, a dark spot or a bright spot that may occur in an edge portion of the display device may be reduced or effectively prevented.

Referring to FIG. 8, an X axis represents a distance in mm from a light source, and Y axis represents a luminance in (candela/meter$^2$[cd/m$^2$]). For example, the edge portion of the display device has a value corresponding to 230 mm on the X axis. The graph line "single" in FIG. 8 corresponds to an intermediate frame having a single angle defined therein, and "double" corresponds to an intermediate frame having a double angle defined therein. Accordingly, based on the simulation results conducted to measure a luminance at the edge portion of the display device and a luminance at the light source, a luminance variation in the display device including the intermediate frame having a double angle (graph line 'double') is shown to be smaller than a luminance variation in the display device including the intermediate frame having a single angle (graph line 'single'). In other words, where the display device includes the intermediate frame having a double angle defined therein, a dark spot or a bright spot that may occur in the edge portion of the display device may be reduced or effectively prevented.

Accordingly, relating to the structure of the display devices illustrated in FIG. 8, the display device of FIGS. 5, 6, 7A and 7B includes the intermediate frame 330 having a double angle defined therein.

Referring to FIGS. 7A and 7B, FIG. 7A illustrates light-absorbing patterns 431, 432, 433 and 434 disposed at different positions adjacent to the edge portion of the display device, and FIG. 7B illustrates luminance variation based on the positions at which the light-absorbing patterns 431, 432, 433 and 434 are disposed. An X axis represents a distance from the edge portion of the display device, and a Y axis represents a luminance in (candela/meter$^2$[cd/m$^2$]). Among the graph lines for light-absorbing patterns 431, 432, 433 and 434, luminance variation is the smallest adjacent to the edge portion of the display device for the light-absorbing pattern 431 disposed on an upper surface of the reflective sheet 430 as compared to the luminance variation illustrated for the light-absorbing patterns 432, 433 and 434 disposed on the inclined surface of the second inclined portion 332. Accordingly, in one or more exemplary embodiment of the display device of FIGS. 5, 6, 7A and 7B, the light-absorbing pattern 431 is disposed on the upper surface of the reflective sheet 430, in a manner similar to that of the display device of FIGS. 1, 2, 3, 4A and 4B.

Hereinafter, another exemplary embodiment of a reflective sheet will be described with reference to FIG. 9. Descriptions of elements in the reflective sheet of FIG. 9 which are the same as those of the reflective sheet of FIGS. 1 to 4B and FIGS. 5 to 8 will be omitted herein for conciseness.

Figure 9:
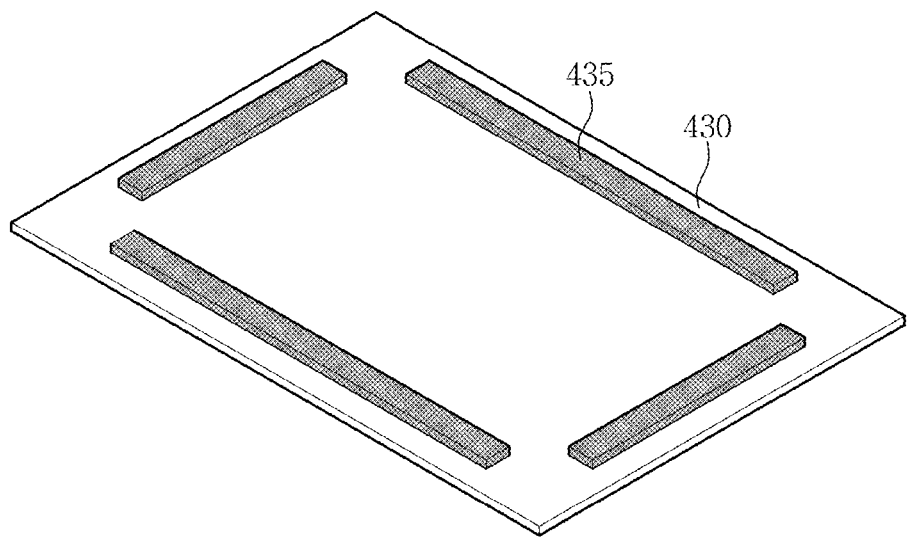
FIG. 9 is a schematic perspective view illustrating another exemplary embodiment of a reflective sheet according to the invention.

FIG. 9 is a schematic perspective view illustrating another exemplary embodiment of a reflective sheet 430 according to the invention.

Referring to FIG. 9, the reflective sheet 430 includes a plurality of light-absorbing patterns 435 disposed thereon. Lengths of each of the light-absorbing patterns 435 are each respectively disposed to be parallel to the side wall portion 442 of the lower frame 440 illustrated in FIG. 2. The plurality of light-absorbing patterns 435 are spaced apart from one another and may be considered as discrete patterns. Because the light-absorbing patterns 435 are not disposed at a corner of the reflective sheet 430 in which a dark spot and a bright spot are less likely to occur, a material and/or manufacturing cost may be saved for the display device.

In addition, discrete light-absorbing patterns 435 may be arranged along an edge portion of the display device in various manners based on the structure of the display device. In other words, although four discrete light-absorbing patterns 435 are illustrated for the reflective sheet 430 in FIG. 9, the number of light-absorbing patterns 435 is not limited thereto. According to exemplary embodiments, the light-absorbing patterns 435 may include more than four light-absorbing patterns, and/or the light-absorbing patterns may only be disposed at a corner of the reflective sheet 430.

Hereinafter, still other exemplary embodiments of a display device will be described with reference to FIGS. 10, 11 and 12. Descriptions of elements in the display devices of FIGS. 10, 11 and 12 which are the same as those of the display devices of FIGS. 1, 2, 3, 4A and 4B and of FIGS. 5, 6, 7A and 7B will be omitted herein for conciseness.

Figure 10:
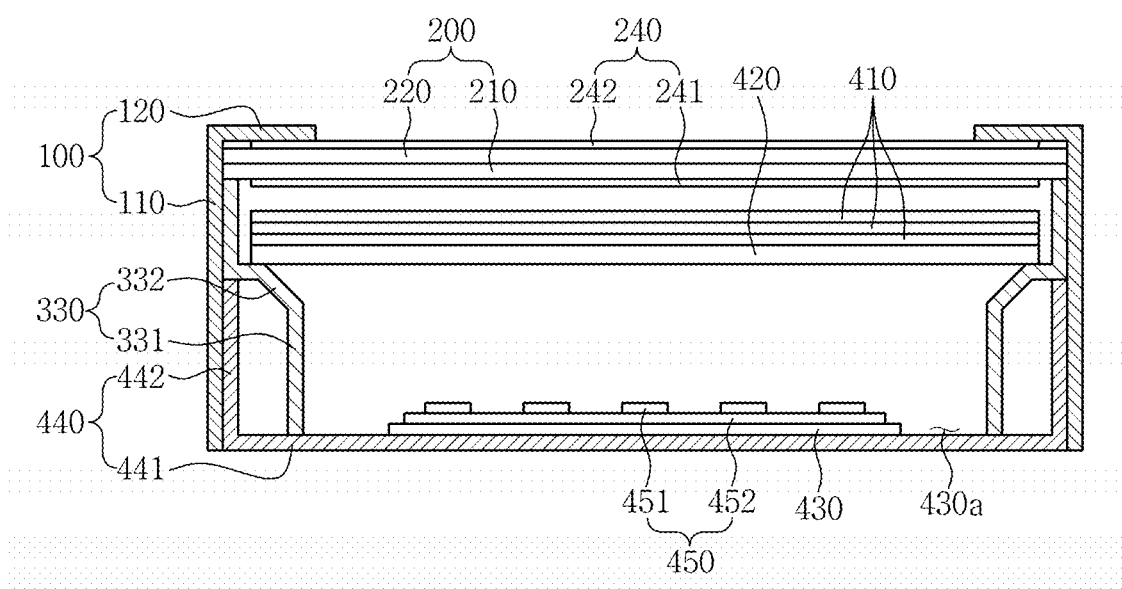
FIG. 10 is a schematic cross-sectional view illustrating still another exemplary embodiment of a display device according to the invention.

FIG. 10 is a schematic cross-sectional view illustrating still another exemplary embodiment of a display device according to the invention. FIG. 11 is a schematic plan view illustrating an exemplary embodiment of a reflective sheet 430, an intermediate frame 330 and a lower frame 440 in the display device of FIG. 10. FIG. 12 is a schematic plan view illustrating another exemplary embodiment of a reflective sheet 430, an intermediate frame 330, and a lower frame in the display device of FIG. 10.

Figure 11:
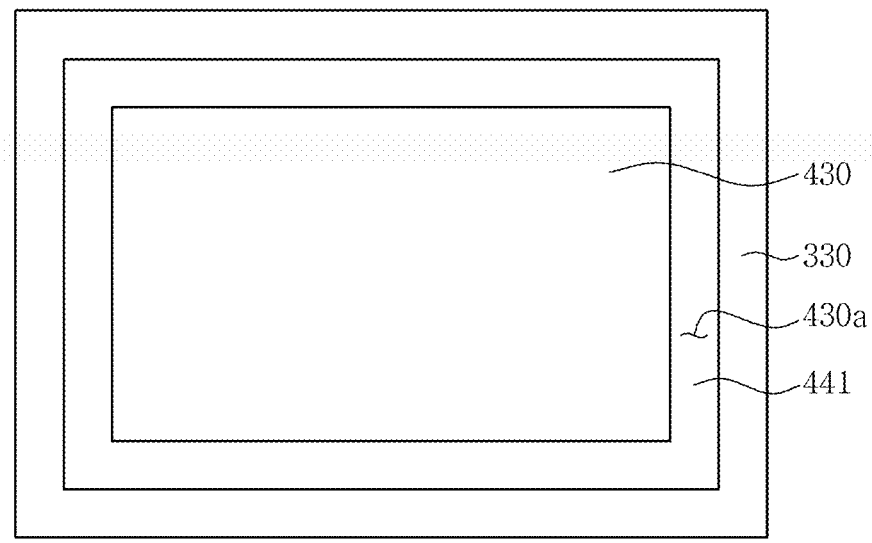
FIG. 11 is a schematic plan view illustrating an exemplary embodiment of a reflective sheet, an intermediate frame and a lower frame in the display device of FIG. 10.

Referring to FIGS. 10 and 11, the display device includes the reflective sheet 430 covering a portion of an upper surface of the lower frame 440, and a separate light-absorbing pattern may be omitted therein.

In detail, the reflective sheet 430 covers a portion of the upper surface of the lower frame 440 and does not cover an edge portion of the upper surface of the lower frame 440. The intermediate frame 330 surrounds the reflective sheet 430. Accordingly, in the top plan view, a portion 430a of the upper surface of the lower frame 440 may be disposed between the reflective sheet 430 and the intermediate frame 330 so as to be exposed externally, and light may be incident on the portion 430a of the upper surface of the lower frame 440. In contrast to the display device of FIGS. 10 and 11, in the display devices of FIGS. 1, 2, 3, 4A and 4B and of FIGS. 5, 6, 7A and 7B, the reflective sheet 430 covers the upper surface of the lower frame 440 such that no portion of the upper surface of the bottom portion 441 is exposed.

Where light is incident on the portion 430a of the upper surface of the lower frame 440 as described above, a same effect as that of the light-absorbing pattern 431 is achieved. That is, the lower frame 440 defines a light-absorbing portion by defining the exposed portion 430a thereof. As previously described, the lower frame 440 may include, for example, a material having excellent heat dissipation properties, such as aluminum (Al) or an Al alloy, and such material also serves as a light-absorbing material.

While the reflective sheet 430 may have a quadrangular planar shape as illustrated in FIG. 10, the shape of the reflective sheet 430 is not limited thereto. According to exemplary embodiments, the reflective sheet 430 may be manufactured into any of a number of shapes which does not entirely cover an edge portion of an upper surface of the lower frame 440.

Figure 12:
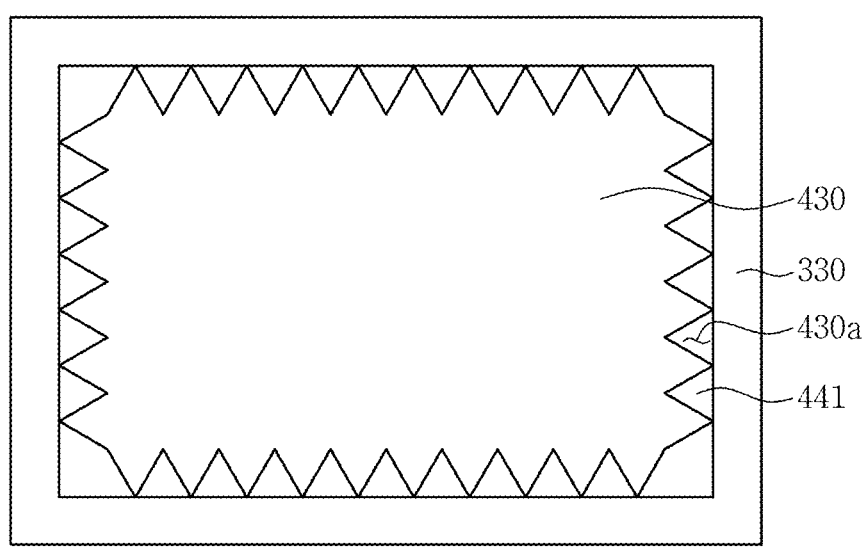
FIG. 12 is a schematic plan view illustrating another exemplary embodiment of a reflective sheet, an intermediate frame and a lower frame in a display device in the display device of FIG. 10.

Accordingly, referring to FIG. 12, in the top plan view, the reflective sheet 430 may have a non-linear edge which defines peaks and valleys along a side thereof. In other words, the display device of FIGS. 10 and 12 has the same configuration as that of the display device of FIGS. 10 and 11, aside from the shape of the reflective sheet 430.

As set forth above, according to one or more exemplary embodiments, in the display device, a dark spot and a bright spot that may occur at the edge portion thereof may be reduced or effectively prevented and the luminance uniformity thereof may be enhanced.

From the foregoing, it will be appreciated that various exemplary embodiments in accordance with the present disclosure have been described herein for purposes of illustration, and that various modifications may be made without departing from the scope and spirit of the present teachings. Accordingly, the various exemplary embodiments disclosed herein are not intended to be limiting of the true scope and spirit of the present teachings. Various features of the above described and other exemplary embodiments can be mixed and matched in any manner, to produce further embodiments consistent with the invention.

What is claimed is:

1. A display device comprising:
   a display panel which displays an image with light;
   a light source which generates the light, the light source disposed on a circuit board;
   a reflective sheet on which the light source is disposed;
   a frame member in which the light source and the reflective sheet are disposed, the frame member comprising:
      a bottom portion overlapped by both the light source and the reflective sheet which are disposed in the frame member, and
      a side wall portion exposed to the light source disposed in the frame member,
      wherein in a top plan view, an upper surface portion of the reflective sheet is exposed between the light source and the side wall portion of the frame member which is exposed to the light source disposed in the frame member; and
   a light-absorbing pattern in the frame member, the light-absorbing pattern extended along the upper surface portion of the reflective sheet which is exposed between the light source and the side wall portion of the frame member which is exposed to the light source disposed in the frame member,
   wherein the light-absorbing pattern in the frame member surrounds the circuit board.

2. The display device of claim 1, wherein the light-absorbing pattern comprises a light-absorbing material.

3. The display device of claim 2, wherein the frame member comprises:
   an intermediate frame which is disposed on the reflective sheet in the frame member and on which the display panel is supported, the intermediate frame defining the side wall portion of the frame member, and
   a lower frame in which the intermediate frame is disposed, the lower frame defining the bottom portion of the frame member.

4. The display device of claim 2, wherein
   the frame member comprises a lower frame in which the light source is disposed, the lower frame defining the bottom portion of the frame member overlapped by both the light source and the reflective sheet, the lower frame comprising a side wall portion which extends from the bottom portion, and
   the reflective sheet is disposed between the light source and the bottom portion of the frame member defined by the lower frame.

5. The display device of claim 4, wherein
   the light-absorbing pattern is provided in plural and arranged spaced apart from one another along the side wall portion of the lower frame, and
   lengths of the plural light-absorbing portions are each disposed parallel to the side wall portion of the lower frame.

6. The display device of claim 1, wherein the side wall portion exposed to the light source disposed in the frame member comprises a first inclined portion extended from the reflective sheet and a second inclined portion which extends from the first inclined portion.

7. The display device of claim 6, wherein
   an angle between the first inclined portion and the reflective sheet is in a range of about 80 degrees to about 110 degrees, and
   an angle between the second inclined portion and the reflective sheet is in a range of about 30 degrees to about 60 degrees.

8. The display device of claim 1, further comprising a diffusion plate between the reflective sheet and the display panel.

9. The display device of claim 8, further comprising an optical sheet between the diffusion plate and the display panel.

10. The display device of claim 1, wherein the light-absorbing pattern is spaced apart from the light source in the top plan view.

11. A display device comprising:
    a display panel which display an image with light;
    a light source which generates the light, the light source disposed on a circuit board;
    a frame member in which the light source is disposed, the frame member comprising:
       a bottom portion overlapped by the light source disposed in the frame member, the bottom portion comprising an upper surface which faces the display panel, and
       a side wall portion exposed to the light source disposed in the frame member; and a reflective sheet in the frame member, the reflective sheet covering a portion of the bottom portion of the frame member, wherein in a top plan view, the side wall portion of the frame member which is exposed to the light source disposed in the frame member surrounds the reflective sheet which is in the frame member, and the surrounded reflective sheet is spaced apart from the side wall to expose a portion of the upper surface of the bottom portion between the light source and the side wall portion spaced apart therefrom, and a light-absorbing member in the frame member, the light-absorbing member between the reflective sheet and the side wall portion spaced apart therefrom, wherein the light-absorbing pattern in the frame member surrounds the circuit board.

12. The display device of claim 11, wherein the exposed portion of the upper surface of the bottom portion is the light-absorbing member disposed between the reflective sheet and the side wall portion spaced apart therefrom.

13. The display device of claim 12, wherein the reflective sheet has a quadrangular shape.

14. The display device of claim 12, wherein in the top plan view, edges of the reflective sheet defines peaks arranged along a side thereof.

15. The display device of claim 12, wherein the the side wall portion of the frame member which is exposed to the light source disposed in the frame member comprises a first inclined portion extended from the reflective sheet and a second inclined portion which extends from the first inclined portion.

16. The display device of claim 15, wherein an angle between the first inclined portion and the reflective sheet is in a range of about 80 degrees to about 110 degrees, and an angle between the second inclined portion and the reflective sheet is in a range of about 30 degrees to about 60 degrees.

17. The display device of claim 12, further comprising a diffusion plate between the reflective sheet and the display panel.

18. The display device of claim 17, further comprising an optical sheet between the diffusion plate and the display panel.

* * * * *